US011492490B2

(12) United States Patent
Tasaki et al.

(10) Patent No.: US 11,492,490 B2
(45) Date of Patent: Nov. 8, 2022

(54) SILICONE RUBBER COMPOSITION AND COMPOSITE OBTAINED USING THE SAME

(71) Applicant: DOW TORAY CO., LTD., Tokyo (JP)

(72) Inventors: Tomoko Tasaki, Ichihara (JP); Takayoshi Otomo, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 276 days.

(21) Appl. No.: 16/957,634

(22) PCT Filed: Dec. 10, 2018

(86) PCT No.: PCT/JP2018/045255

§ 371 (c)(1),
(2) Date: Jun. 24, 2020

(87) PCT Pub. No.: WO2019/131081

PCT Pub. Date: Jul. 4, 2019

(65) Prior Publication Data

US 2021/0054199 A1 Feb. 25, 2021

(30) Foreign Application Priority Data

Dec. 25, 2017 (JP) ............................ JP2017-248503

(51) Int. Cl.
*C08L 83/04* (2006.01)

(52) U.S. Cl.
CPC ......... *C08L 83/04* (2013.01); *C08L 2205/025* (2013.01)

(58) Field of Classification Search
CPC .......... C08L 83/04; C08L 83/07; C08L 83/05; C08L 2205/025; C08K 9/06; C08K 9/04
See application file for complete search history.

(56) References Cited

U.S. PATENT DOCUMENTS

| | | | | |
|---|---|---|---|---|
| 10,968,375 | B2 * | 4/2021 | Otomo | C09J 183/10 |
| 2002/0032270 | A1 | 3/2002 | Azechi | |
| 2006/0106156 | A1 | 5/2006 | Woerner | |
| 2007/0100072 | A1 | 5/2007 | Akitomo et al. | |
| 2008/0064811 | A1 * | 3/2008 | Todoroki | C08L 83/04 524/588 |
| 2010/0190395 | A1 * | 7/2010 | Nozoe | D06N 3/128 427/372.2 |
| 2011/0190410 | A1 * | 8/2011 | Nozoe | C08G 77/20 521/154 |
| 2012/0232219 | A1 | 9/2012 | Kato et al. | |
| 2012/0301644 | A1 * | 11/2012 | Blackwood | D06N 3/128 427/407.1 |
| 2013/0071591 | A1 * | 3/2013 | Yamamoto | D03D 1/04 428/36.1 |
| 2013/0345359 | A1 | 12/2013 | Onai et al. | |
| 2015/0228372 | A1 * | 8/2015 | Akitomo | C08L 83/04 252/511 |
| 2015/0252238 | A1 * | 9/2015 | Takahashi | C08L 83/00 252/500 |
| 2016/0032101 | A1 | 2/2016 | Okada et al. | |
| 2017/0081499 | A1 * | 3/2017 | Hotta | H01B 3/28 |
| 2017/0158821 | A1 * | 6/2017 | Todoroki | C08L 83/04 |
| 2018/0057652 | A1 * | 3/2018 | Irie | C08J 9/0061 |
| 2019/0225806 | A1 * | 7/2019 | Muramatsu | C08G 77/70 |
| 2019/0375908 | A1 * | 12/2019 | Endo | C08K 3/34 |
| 2020/0165455 | A1 * | 5/2020 | Ashida | C08L 83/04 |
| 2020/0291187 | A1 * | 9/2020 | Beukema | C08G 77/06 |

FOREIGN PATENT DOCUMENTS

| | | | |
|---|---|---|---|
| CN | 1781991 | A | 6/2006 |
| CN | 102190908 | A | 9/2011 |
| CN | 102827479 | A | 12/2012 |
| CN | 104419208 | A | 5/2019 |
| EP | 2845880 | A1 | 3/2015 |
| JP | 2012001673 | A | 1/2012 |
| JP | 2012184350 | A | 9/2012 |
| JP | 2014031436 | A | 2/2014 |
| JP | 2016145301 | A | 8/2016 |
| JP | 2016180123 | A | 10/2016 |
| JP | 2019014801 | A | 1/2019 |
| WO | 2017147061 | A1 | 8/2017 |

OTHER PUBLICATIONS

Machine assisted English translation of CN102190908A obtained from https://patents.google.com/patent on Oct. 20, 2021, 8 pages.
Machine assisted English translation of CN102827479A obtained from https://patents.google.com/patent on Oct. 20, 2021, 9 pages.
English translation of International Search Report for PCT/JP2018/045255 dated Mar. 12, 2019, 2 pages.
Machine assisted English translation of JP2012001673A obtained from https://patents.google.com/patent on Jun. 24, 2020, 11 pages.
Machine assisted English translation of JP2014031436A obtained from https://patents.google.com/patent on Jun. 24, 2020, 19 pages.

(Continued)

*Primary Examiner* — Ellen M Mcavoy

(74) *Attorney, Agent, or Firm* — Warner Norcross + Judd LLP

(57) ABSTRACT

A silicone rubber composition is disclosed. The silicone rubber composition comprises: (A) an organosiloxane having at least two alkenyl groups in each molecule; (B) a silica filler; (C) an organopolysiloxane having at least two silicon atom-bonded hydrogen atoms in each molecule; (D) a hydrosilylation reaction catalyst; and (F) an adhesion promoter. Component (B) is prepared by surface-treating a silica filler with (E) a surface treatment agent in the presence of part or all of component (A). The silicone rubber composition generally exhibits excellent adhesion to various organic resins in contact during curing while simultaneously exhibiting excellent mold releasability with respect to a mold used for the molding thereof.

11 Claims, No Drawings

(56) References Cited

OTHER PUBLICATIONS

Machine assisted English translation of JP2016145301A obtained from https://patents.google.com/patent on Jun. 24, 2020, 12 pages.
Machine assisted English translation of JP2016180123A obtained from https://patents.google.com/patent on Jun. 24, 2020, 14 pages.
Machine assisted English translation of JP2019014801A obtained from https://patents.google.com/patent on Jun. 24, 2020, 12 pages.

* cited by examiner

SILICONE RUBBER COMPOSITION AND COMPOSITE OBTAINED USING THE SAME

CROSS-REFERENCE TO RELATED APPLICATIONS

This application is the National Stage of International Appl. No. PCT/JP2018/045255 filed on 10 Dec. 2018, which claims priority to and all advantages of Japanese Appl. No. 2017-248503 filed on 25 Dec. 2017, the content of which is hereby incorporated by reference.

TECHNICAL FIELD

The present invention relates to a silicone rubber composition and a composite produced from the silicone rubber composition.

BACKGROUND ART

Silicone rubber compositions, which exhibit adhesion with respect to organic resins in contact during curing while simultaneously exhibiting mold releasability with respect to molds used for the molding thereof, are well known. For example, the specification of U.S. Patent Application Publication No. 2002/0032270 discloses a silicone rubber composition comprising: a heat-curable organopolysiloxane composition, a reinforcing fine silica powder, an adhesion promoter, and an organosilicon compound having a functional group that is reactive with the organopolysiloxane composition and having a siloxane skeleton that is incompatible with the organopolysiloxane composition. In addition, the specification of U.S. Patent Application Publication No. 2007/0100072 discloses a silicone rubber composition comprising: an organopolysiloxane having at least two silicon atom-bonded alkenyl groups in each molecule, an organopolysiloxane having at least two silicon atom-bonded hydrogen atoms in each molecule, an alkylene glycol diacrylic acid ester or alkylene glycol dimethacrylic acid ester, and a hydrosilylation reaction catalyst.

However, since the former silicone rubber composition forms a silicone rubber having a poor appearance, the uses thereof are limited. Further, the former silicone rubber composition has insufficient adhesion to various organic resins in contact during curing. In addition, the latter silicone rubber composition has insufficient adhesion to various organic resins in contact during curing, while at the same time, the mold releasability with respect to a mold used for the molding thereof is also insufficient.

PRIOR ART DOCUMENTS

Patent Documents

Patent Document 1: U.S. Patent Application Publication No. 2002/0032270 Specification Patent Document 2: U.S. Patent Application Publication No. 2007/0100072 Specification

SUMMARY OF THE INVENTION

Problems to be Solved by the Invention

An object of the present invention is to provide a silicone rubber composition exhibiting excellent adhesion to various organic resins in contact during curing while simultaneously exhibiting excellent mold releasability with respect to a mold used for the molding thereof. Another object of the present invention is to provide a composite material in which a silicone rubber is sufficiently adhered to at least one type of organic resin.

Means for Solving the Problems

The silicone rubber composition of the present invention comprises:

(A) 100 parts by mass of an organopolysiloxane having at least two alkenyl groups in each molecule;

(B) from 1 to 100 parts by mass of a silica filler;

(C) an organosiloxane having at least two silicon atom-bonded hydrogen atoms in each molecule and not having an alkenyl group, in an amount such that the silicon atom-bonded hydrogen atoms in the component are from 0.5 to 5 mol per 1 mol of the total of aliphatic saturated bonds in the composition;

(D) a catalytic amount of a hydrosilylation reaction catalyst; and (F) from 0.01 to 20 parts by mass of an adhesion promoter; wherein component (B) is a silica filler formed by surface-treating at least 30 parts by mass of (E) a surface treatment agent with respect to 100 parts by mass of a silica filler having at specific surface area of at least 50 $m^2/g$ according to a BET method in the presence of part or all of component (A).

The composite material of the present invention comprises: a silicone rubber formed by curing the silicone rubber composition of the present invention and an organic resin, wherein the silicone rubber is adhered to the organic resin.

Effects of the Invention

The silicone rubber composition of the present invention exhibits excellent adhesion to various organic resins in contact during curing while simultaneously exhibiting excellent mold releasability with respect to a mold used for the molding thereof. In addition, in the composite material of the present invention, a silicone rubber is sufficiently adhered to at least one type of organic resin.

MODE FOR CARRYING OUT THE INVENTION

[Silicone Rubber Composition]

Component (A) is an organopolysiloxane having at least two alkenyl groups in each molecule. Exemplary alkenyl groups in component (A) include alkenyl groups having 2 to 12 carbon atoms, such as vinyl groups, allyl groups, butenyl groups, pentenyl groups, hexenyl groups, heptenyl groups, octenyl groups, nonenyl groups, decenyl groups, undecenyl groups, and dodecenyl groups, among which vinyl groups are preferable. Examples of silicon atom-bonded groups other than alkenyl groups in component (A) include alkyl groups having from 1 to 12 carbon atoms such as methyl groups, ethyl groups, propyl groups, isopropyl groups, butyl groups, isobutyl groups, terbutyl groups, pentyl groups, neopentyl groups, hexyl groups, cyclohexyl groups, heptyl groups, octyl groups, nonyl groups, decyl groups, undecyl groups, and dodecyl groups; aryl groups having from 6 to 12 carbon atoms such as phenyl groups, tolyl groups, xylyl groups, and naphthyl groups; and groups in which some or all of the hydrogen atoms of these alkyl groups are substituted with halogen atoms such as fluorine atoms, chlorine atoms, or bromine atoms. A small amount of hydroxyl groups may be bonded to the silicon atoms in component (A) to an extent that the object of the present invention is not impaired.

While a molecular structure of component (A) is not particularly limited, examples thereof include a linear structure, partially branched linear structure, branched structure, cyclic structure, and three-dimensional network structure. Component (A) may be one type of organopolysiloxane having these molecular structures or a mixture of two or more types of organopolysiloxanes having these molecular structures. Examples of such component (A) include dimethylpolysiloxanes capped at both molecular chain terminals with dimethylvinylsiloxy groups, dimethylsiloxane/methylphenylsiloxane copolymers capped at both molecular chain terminals with dimethylvinylsiloxy groups, dimethylsiloxane/methylvinylsiloxane copolymers capped at both molecular chain terminals with dimethylvinylsiloxy groups, dimethylsiloxane/methylvinylsiloxane copolymers capped at both molecular chain terminals with trimethylsiloxy groups, dimethylsiloxane/methylphenylsiloxane/methylvinylsiloxane copolymers capped at both molecular chain terminals with trimethylsiloxy groups, copolymers including a $(CH_3)_3SiO_{1/2}$ unit, a $(CH_3)_2(CH_2{=}CH)SiO_{1/2}$, and a $SiO_{4/2}$ unit, copolymers including a $(CH_3)_2(CH_2{=}CH)SiO_{1/2}$ unit and a $SiO_{4/2}$ unit, and mixtures of two or more types thereof.

While a viscosity of component (A) at 25° C. is not limited, it is preferably within a range of from 100 to 100,000 mPa·s. This is because, when the viscosity is greater than or equal to the lower limit of the range described above, the present composition forms a silicone rubber having good mechanical characteristics, while when the viscosity is less than or equal to the upper limit of the range described above, the handleability of the present composition is favorable. This viscosity can be measured using a B-type viscometer in accordance with JIS K 7117-1:1999.

Component (B) is a silica filler for enhancing mechanical strength of a silicone rubber obtained by curing the present composition, having excellent adhesion with respect to various organic resins in contact with the present composition during curing, and simultaneously exhibiting an effect of having mold releasability with respect to a mold used for the molding thereof. Component (B) is a silica filler formed by surface-treating at least 30 parts by mass of (E) a surface treatment agent with respect to 100 parts by mass of a silica filler having at specific surface area of at least 50 $m^2/g$ according to a BET method in the presence of part or all of component (A).

The silica filler of component (B) prior to surface treatment with component (E) has a specific surface area of at least 50 $m^2/g$ according to the BET method, and preferably at least 100 $m^2/g$, alternatively at least 200 $m^2/g$. Such a silica filler may be untreated or surface-treated in advance, and is preferably an untreated silica filler. HDK (registered trademark) manufactured by Wacker, AEROSIL (registered trademark) manufactured by Nippon Aerosil Co., Ltd., and the like are available as such untreated silica fillers.

Examples of the surface treatment agent of component (E) include organohalosilanes such as trimethylchlorosilane and dimethyldichlorosilane; organosilazanes such as hexamethyldisilazane, 1,1,3,3-tetramethyl-1,3-divinyldisilazane, and hexamethylcyclotrisilazane; and organoalkoxysilanes such as methyltrimethoxysilane, ethyltrimethoxysilane, methyltriethoxysilane, hexyltrimethoxysilane, and octyltrimethoxysilane. Organosilazanes are preferable, and it is even more preferable to use hexamethyldisilazane and 1,1,3-3-tetramethyl-1,3-divinyldisilazane in combination.

Component (E) is treated with in an amount of at least 30 parts by mass and preferably at least 35 parts by mass per 100 parts by mass of the silica filler in the presence of part or all of component (A). This is because, when the treated amount of component (E) is within the range described above, excellent adhesion to various organic resins is achieved, and the viscosity of the present composition decreases so that the moldability is enhanced.

The preparation method for component (B) is not particularly limited, and the method preferably includes charging some or all of component (A) that is present, the silica filler, and component (E) into a kneading device that is hermetically sealed at normal pressure, kneading at room temperature or while heating in the presence of an inert gas as necessary, and then kneading while heating under reduced pressure. Note that water or a reaction catalyst may be added as necessary to facilitate the treatment of the silica filler by the surface treatment agent.

Component (C) is a crosslinking agent for the present composition and is an organopolysiloxane having at least two silicon atom-bonded hydrogen atoms in each molecule and not having alkenyl groups. Examples of silicon atom-bonded groups other than hydrogen atoms in component (C) include alkyl groups having from 1 to 12 carbon atoms such as methyl groups, ethyl groups, propyl groups, isopropyl groups, butyl groups, isobutyl groups, terbutyl groups, pentyl groups, neopentyl groups, hexyl groups, cyclohexyl groups, heptyl groups, octyl groups, nonyl groups, decyl groups, undecyl groups, and dodecyl groups; aryl groups having from 6 to 12 carbon atoms such as phenyl groups, tolyl groups, xylyl groups, and naphthyl groups; and groups in which some or all of the hydrogen atoms of these alkyl groups are substituted with halogen atoms such as fluorine atoms, chlorine atoms, or bromine atoms. A small amount of hydroxyl groups may be bonded to the silicon atoms in component (C) to an extent that the object of the present invention is not impaired.

A molecular structure of component (C) is not limited, and examples include straight chain, partially branched straight chain, branched chain, cyclic, and three-dimensional network structures. A partially branched straight chain, branched chain, or three-dimensional network structure is preferable.

While a viscosity of component (C) at 25° C. is not limited, it is preferably not greater than 10,000 mPa·s, alternatively within a range of from 1 to 5,000 mPa·s, or alternatively within a range of from 1 to 1,000 mPa·s. This is because, when the viscosity is greater than or equal to the lower limit of the range described above, the present composition forms a silicone rubber having good mechanical characteristics, while when the viscosity is less than or equal to the upper limit of the range described above, the handleability of the present composition is favorable. This viscosity can be measured using a B-type viscometer in accordance with JIS K 7117-1:1999.

Examples of such component (C) include 1,1,3,3-tetramethyldisiloxane, 1,3,5,7-tetramethylcyclotetrasiloxane, methylhydrogenpolysiloxane capped at both molecular chain terminals with trimethylsiloxy groups, dimethylsiloxane/methylhydrogensiloxane copolymers capped at both molecular chain terminals with trimethylsiloxy groups, dimethylsiloxane/methylhydrogensiloxane copolymers capped at both molecular chain terminals with dimethylhydrogensiloxy groups, copolymers including a $(CH_3)_2HSiO_{1/2}$ unit and a $SiO_{4/2}$ unit, copolymers including a $(CH_3)_2HSiO_{1/2}$ unit, a $SiO_{4/2}$ unit, and a $(C_6H_5)SiO_{3/2}$ unit, and mixtures of two or more types thereof.

Component (C) is compounded in an amount such that the silicon atom-bonded hydrogen atoms in the component are within a range of from 0.5 to 5 mol, alternatively within a range of from 0.8 to 2.5 mol, per 1 mol of the total of aliphatic unsaturated bonds in the present composition—for example, the alkenyl groups in component (A), alkenyl groups in component (G-2), and aliphatic carbon-carbon double bonds in component (F). This is because, when the compounded amount of component (C) is greater than or equal to the lower limit of the range described above, the present composition forms a silicone rubber having good adhesion with respect to various organic resins, while when the compounded amount is less than or equal to the upper limit of the range described above, the present composition forms a silicone rubber having good mechanical characteristics. Note that a content of silicon atom-bonded hydrogen atoms in component (C) can be determined by an analytical method such as Fourier transform infrared spectroscopy (FT-IR), nuclear magnetic resonance analysis (NMR), or gel permeation chromatography analysis (GPC).

Component (D) is a hydrosilylation reaction catalyst for accelerating curing of the present composition, with examples thereof including platinum based catalysts, rhodium based catalysts, and palladium based catalysts. In particular, component (D) is preferably a platinum based catalyst since it can noticeably accelerate the curing of the present composition. Exemplary platinum based catalysts include finely powdered platinum, chloroplatinic acid, an alcohol solution of chloroplatinic acid, platinum-alkenyl siloxane complexes, platinum-olefin complexes, and platinum-carbonyl complexes, among which platinum-alkenyl siloxane complexes are preferable.

The compounded amount of component (D) in the present composition is not particularly limited as long as the compounded amount is an amount effective to accelerate the curing of the present composition, however, the compounded amount is preferably such that the amount of the catalyst metal in component (D) is within a range of from 1 to 1,000 ppm, alternatively within a range of from 1 to 500 ppm, or alternatively within a range of from 1 to 300 ppm in mass units relative to the present composition. This is because, when the compounded amount of component (D) is within the range described above, the curing reaction of the obtained composition is accelerated.

Component (F) is an adhesion promoter for improving the adhesion of the obtained silicone rubber. Examples of such component (F) include acrylic compounds, methacrylic compounds, epoxy compounds, organosilicon compounds having at least one phenylene skeleton in each molecule, and organosilicon compounds having at least one silicon atom-bonded hydrolyzable group in each molecule. Among these, the acrylic compounds or methacrylic compounds having an ester bond in each molecule are preferable.

The acrylic compound or methacrylic compound of component (F) is not limited, but is preferably at least one type of acrylic compounds or methacrylic compounds selected from a compound represented by the following general formula (1):

[Formula 1]

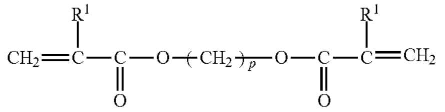

a compound represented by the following general formula (2):

[Formula 2]

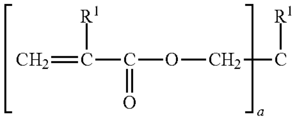

a compound represented by the following general formula (3):

[Formula 3]

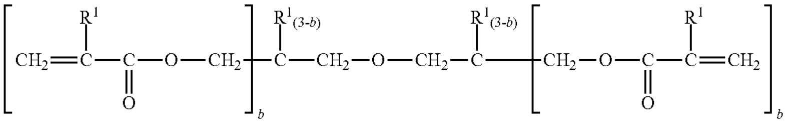

and a compound represented by the following general formula (4):

[Formula 4]

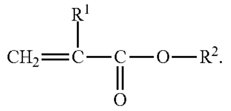

In general formulas (1) to (4) above, each R is independently a hydrogen atom or a methyl group and is preferably a hydrogen atom.

In general formula (4) above, $R^2$ is an aralkyl group, a phenoxyalkyl group, or a phenoxyhydroxyalkyl group having from 7 to 20 carbon atoms. Examples of the aralkyl group in component (C) include benzyl groups, phenethyl groups, and phenylpropyl groups. Examples of the phenoxyalkyl group in component (C) include phenoxyethyl groups and phenoxypropyl groups. Examples of the phenoxyhydroxyalkyl group in component (C) include phenoxyhydroxypropyl groups.

In general formula (2) above, "a" is an integer from 1 to 4, alternatively an integer from 2 to 4, or alternatively an integer of 3 or 4.

In general formula (3) above, each "b" is independently an integer from 1 to 3, alternatively an integer of 2 or 3.

In general formula (2) above, "p" is an integer from 4 to 12, alternatively an integer from 1 to 10, alternatively an integer from 6 to 12, or alternatively an integer from 6 to 10.

The epoxy compound of component (F) is not limited, but preferable examples thereof include glycidoxy methacrylates, a chain siloxane compound represented by the following formula:

[Formula 5]

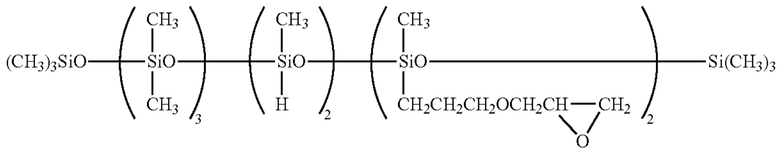

a cyclic siloxane compound represented by the following formula:

[Formula 6]

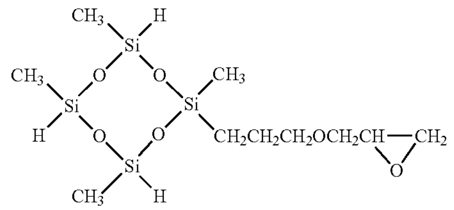

and a chain siloxane compound represented by the following formula:

[Formula 7]

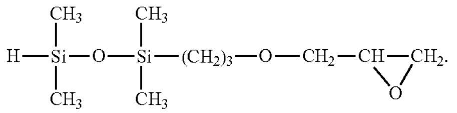

The organosilicon compound having at least one phenylene skeleton in each molecule of component (F) is not limited, but preferable examples include a compound represented by the following formula:

[Formula 8]

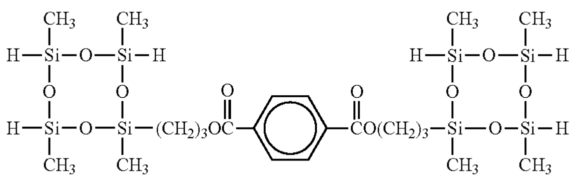

a compound represented by the following formula:

[Formula 9]

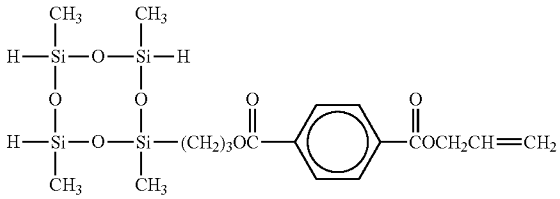

a compound represented by the following formula:

[Formula 10]

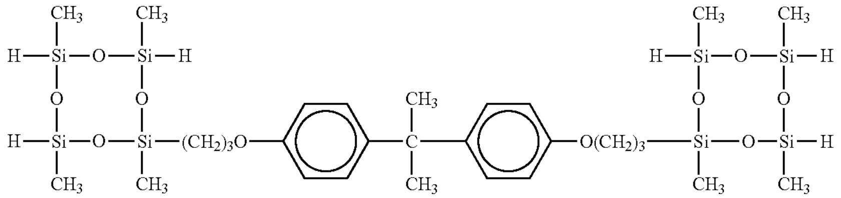

and a compound represented by the following formula:

[Formula 11]

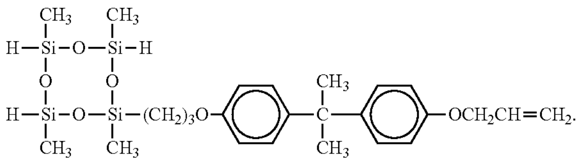

The organosilicon compound having at least one silicon atom-bonded hydrolyzable group in each molecule of component (F) is not particularly limited, but preferable examples thereof include vinyltrimethoxysilane, vinyltriethoxysilane, vinyl tris(2-methoxyethoxy)silane, vinyldiethoxymethylsilane, allyltrimethoxysilane, phenyltrimethoxysilane, 3-glycidoxypropyltrimethoxysilane, 2-(3,4-epoxycyclohexyl)ethyltrimethoxysilane, 3-aminopropyltrimethoxysilane, 3-aminopropyltriethoxysilane, N-(2-aminoethyl)-3-aminopropyltrimethoxysilane, acryloyloxymethyltrimethoxysilane, 3-methacryloxypropyltrimethoxysilane, 3-acryloxypropyltrimethoxysilane, 1,6-bis(trimethoxysilyl)hexane, 3-mercaptopropyltrimethoxysilane, 2-(ethoxycarbonyl)ethyltrimethoxysilane, a cyclic siloxane compound represented by the following formula:

[Formula 12]

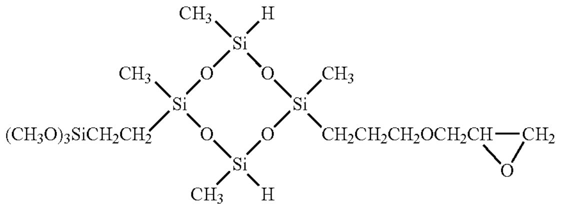

a chain siloxane compound represented by the following formula:

[Formula 13]

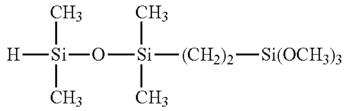

a chain siloxane compound represented by the following formula:

[Formula 14]

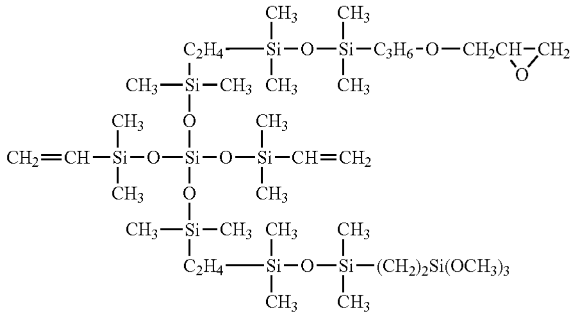

a chain siloxane compound represented by the following formula:

[Formula 15]

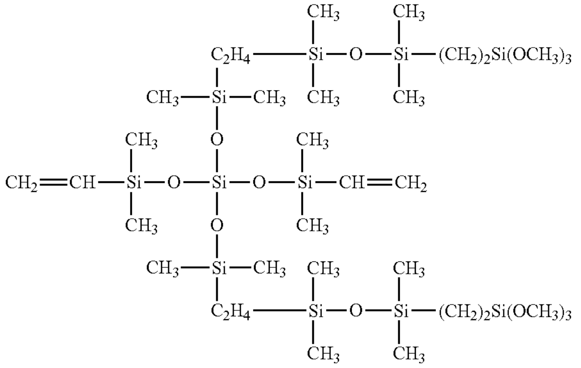

and a chain siloxane compound represented by the following formula:

[Formula 16]

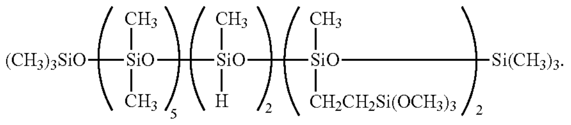

The content of component (F) is within a range of from 0.01 to 20 parts by mass, preferably within a range of from 0.05 to 10 parts by mass, alternatively within a range of from 0.1 to 5 parts by mass, per 100 parts by mass of component (A). This is because, when the compounded amount of component (F) is greater than or equal to the lower limit of the range described above, the present composition forms a silicone rubber having good adhesion with respect to various organic resins, while when the compounded amount is less than or equal to the upper limit of the range described above, the present composition forms a silicone rubber having good mechanical characteristics.

In order to further enhance the adhesion of the obtained silicone rubber, the silicone rubber composition of the present invention may further comprise (G) (G-1) an organosiloxane having at least one aryl group and at least one silicon atom-bonded hydrogen atom in each molecule; or a mixture of component (G-1) and (G-2) an organosiloxane having at least one aryl group and at least one alkenyl group in each molecule.

Component (G-1) is an organosiloxane having at least one silicon atom-bonded hydrogen atom in each molecule and not having an alkenyl group. Examples of the aryl group in component (G-1) include aryl groups having from 6 to 12 carbon atoms such as phenyl groups, tolyl groups, xylyl groups, and naphthyl groups, and phenyl groups are preferable. Examples of groups bonded to silicon atoms other than aryl groups in component (G-1) include alkyl groups having from 1 to 12 carbon atoms such as methyl groups, ethyl groups, propyl groups, isopropyl groups, butyl groups, isobutyl groups, terbutyl groups, pentyl groups, neopentyl groups, hexyl groups, cyclohexyl groups, heptyl groups, octyl groups, nonyl groups, decyl groups, undecyl groups, and dodecyl groups; and groups in which some or all of the hydrogen atoms of these alkyl groups are substituted with halogen atoms such as fluorine atoms, chlorine atoms, or bromine atoms. A small amount of hydroxyl groups may be bonded to the silicon atoms in component (G-1) to an extent that the object of the present invention is not impaired.

A molecular structure of component (G-1) is not limited, but component (G-1) is preferably an organosiloxane represented by the following general formula (4):

[Formula 17]

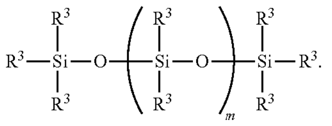

In general formula (4) above, each $R^3$ is independently a hydrogen atom, an alkyl group having from 1 to 12 carbon atoms, or an aryl group having from 6 to 12 carbon atoms. Examples of alkyl groups include the same alkyl groups as described above. Examples of aryl groups include the same aryl groups as described above. However, in general formula (4) above, at least one $R^3$ is the hydrogen atom, and preferably at least two $R^3$ are the hydrogen atoms. Further, at least one $R^3$ is the aryl group in general formula (4) above.

In general formula (4) above, "m" is an integer from 1 to 20, alternatively an integer from 1 to 10, or alternatively an integer from 1 to 5. This is because, when "m" is within the range described above, the present composition forms a silicone rubber having good adhesion with respect to organic resins.

Component (G-2) is an organosiloxane having at least one aryl group and at least one alkenyl group in each molecule. Examples of the aryl group in component (G-2) include aryl groups having from 6 to 12 carbon atoms such as phenyl groups, tolyl groups, xylyl groups, and naphthyl groups, and phenyl groups are preferable. Examples of the alkenyl group in component (G-2) include alkenyl groups having from 2 to 12 carbon atoms such as vinyl groups, allyl groups, butenyl groups, pentenyl groups, hexenyl groups, heptenyl groups, octenyl groups, nonenyl groups, decenyl groups, undecenyl groups, and dodecenyl groups, and vinyl groups are preferable. Examples of silicon atom-bonded groups other than aryl groups and alkenyl groups in component (G-2) include alkyl groups having from 1 to 12 carbon atoms such as methyl groups, ethyl groups, propyl groups, isopropyl groups, butyl groups, isobutyl groups, terbutyl groups, pentyl groups, neopentyl groups, hexyl groups, cyclohexyl groups, heptyl groups, octyl groups, nonyl groups, decyl groups, undecyl groups, and dodecyl groups; and groups in which some or all of the hydrogen atoms of these alkyl groups are substituted with halogen atoms such as fluorine atoms, chlorine atoms, or bromine atoms. A small amount of hydroxyl groups may be bonded to the silicon atoms in component (G-2) to an extent that does not impair the object of the present invention.

A molecular structure of component (G-2) is not limited, but component (G-2) is preferably an organosiloxane represented by the following general formula (5):

[Formula 18]

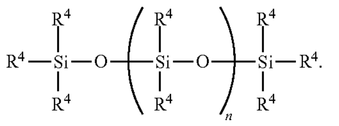

In the general formula (5) above, each $R^4$ is independently an alkenyl group having from 2 to 12 carbon atoms, an alkyl group having from 1 to 12 carbon atoms, or an aryl group having from 6 to 12 carbon atoms. Examples of alkenyl groups include the same alkenyl groups as described above. Examples of alkyl groups include the same alkyl groups as described above. Examples of aryl groups include the same aryl groups as described above. However, in the general formula (5) above, at least one $R^4$ is the alkenyl group, or at least two $R^4$ are the alkenyl groups. Further, at least one $R^4$ in general formula (5) above is the aryl group.

In the general formula (5) above, "n" is an integer from 0 to 20, alternatively an integer from 0 to 10, or alternatively an integer from 0 to 5. This is because, when "n" is less than or equal to the upper limit of the range described above, the present composition forms a silicone rubber having good adhesion with respect to organic resins.

Component (G) is preferably a mixture of component (G-1) and component (G-2). In this case, the mass ratio of component (G-1) and component (G-2) is not limited, but is preferably within a range of from 1:10 to 10:1, alternatively within a range of from 1:5 to 5:1. This is because, when the mass ratio is within the range described above, the present composition forms a silicone rubber having good adhesion with respect to various organic resins.

Component (G) is compounded in an amount within a range of from 0.1 to 5 parts by mass, alternatively within a range of from 0.5 to 5 parts by mass, or alternatively within a range of from 1 to 5 parts by mass, per 100 parts by mass of component (A). This is because, when the compounded amount of component (G) is greater than or equal to the lower limit of the range described above, the present composition forms a silicone rubber having good adhesion with respect to various organic resins, while when the compounded amount is less than or equal to the upper limit of the range described above, the present composition forms a silicone rubber having good mechanical characteristics.

Further, the present composition may contain a reaction inhibitor. Examples of this reaction inhibitor include alkyne alcohols such as 1-ethynyl-cyclohexan-1-ol, 2-methyl-3-butyn-2-ol, 3,5-dimethyl-1-hexyn-3-ol, and 2-phenyl-3-butyn-2-ol; ene-yne compounds such as 3-methyl-3-penten-1-yne and 3,5-dimethyl-3-hexen-1-yne; alkenyl siloxane oligomers such as 1,3,5,7-tetramethyl-1,3,5,7-tetravinyl cyclotetrasiloxane and 1,3,5,7-tetramethyl-1,3,5,7-tetrahexenyl cyclotetrasiloxane; as well as hydrazine, triazole, phosphine, mercaptan, organic nitrogen compounds, acetylene alcohol, silylated acetylene alcohol, maleic acid, fumaric acid, ethylenic or aromatic unsaturated amides, ethylenic unsaturated isocyanates, olefinic silanes, olefinic siloxanes, unsaturated hydrocarbon monoesters and diesters, hydroperoxide, nitriles, and diaziridine. The compounded amount of the reaction inhibitor is not particularly limited, but is preferably within the range of from 0.0001 to 5 parts by mass per 100 parts by mass of component (A).

The silicone rubber composition of the present invention is suitable for obtaining an integral mold with an organic resin.

Examples of methods for integrally molding a silicone rubber composition on an organic resin include: (i) a method of placing a silicone rubber composition formed into a desired shape on an organic resin and then heating to a temperature below the melting point of the organic resin; (ii) a method of placing a silicone rubber composition on an organic resin and then compression-molding at a temperature below the melting point of the organic resin; and (iii) a method of injection-molding an organic resin into a mold using an injection molding machine in advance, and then injecting a silicone rubber composition into the mold while heating. This silicone rubber composition may be a liquid, a putty, or a paste, but is preferably a liquid or a paste in that it is easy to mold. Curing conditions of the silicone rubber composition include a temperature and time at which the shape or quality does not change in order to achieve strong adhesion to the organic resin. The conditions depend on the type of the organic resin, but an integral mold can be obtained under conditions including a temperature of from 80 to 180° C. and a molding time of from 0.2 to 30 minutes.

A silicone rubber obtained from the silicone rubber composition described above preferably has a Shore A hardness (durometer) of not greater than 80, alternatively not greater than 60.

[Composite]

The composite of the present invention comprises: a silicone rubber formed by curing the silicone rubber composition described above; and an organic resin, wherein the silicone rubber is adhered to the organic resin.

Examples of organic resins include acrylonitrile/butadiene/styrene copolymers, polyphenylene/styrene mixtures, polystyrenes, polycarbonates, polyurethanes, polyethylenes, polypropylenes, polyacrylates, polymethacrylates, polyacrylamides, polyesters, polyethylene terephthalates, polybutylene terephthalates, polyphenylene oxides, polyphenylene sulfides, polysulfones, nylons, polyamides, polyimides, fluoropolymers, liquid crystal resins, polyether imides, phenol resins, epoxy resins, urea resins, melamine resins, alkyd resins, derivatives of these organic resins, and mixtures of two or more types thereof.

Such a composite material has a structure in which the silicone rubber and the organic resin are used as an integral part. Examples of such composite materials include mobile telephones, portable telecommunications devices, gaming devices, watches, receivers, DVD devices, MD devices, CD devices, precision electronics, electrical insulators, single-wire coatings, microwaves, refrigerators, electronic cookers, cathodic TVs, thin-film displays such as liquid crystal TVs or plasma TVs, various household devices, copying machines, printers, facsimile machines, office devices, connector seals, spark plug caps, various sensor parts, automotive parts, sports products, diving masks, diving equipment, respirator masks, ventilator bellows, balloon catheters, rubber nipples, thin films, switch covers, medical products or devices, tubes or valves, pacifiers, and feeding bottle nipples.

EXAMPLES

The silicone rubber composition and composite of the present invention will be described in further detail hereinafter using examples and comparative examples. Note that the present invention is not limited by the descriptions of the following examples. The viscosity was measured at 25° C.

[Hardness of Silicone Rubber]

A silicone rubber sheet having a thickness of 2 mm was produced by heating the silicone rubber composition for 10 minutes at 120° C. using a 50-ton hot press. The hardness of the silicone rubber sheet at 25° C. was measured using a Shore A hardness meter.

[Evaluation of Adhesion]

The silicone rubber composition was applied to a test piece and then placed in a preheated stainless steel mold. With the exception of polyester resins, the test pieces were molded for 4 minutes at 120° C. using a 50-ton hot press. The test pieces were stored overnight in an aging chamber (25° C., 50% RH) prior to a peel test. The rate of a 90 peel test at 25° C. was 50 mm/min. In addition, after the peel test, the proportion of the area of the silicone rubber that had failed to aggregate with respect to the adhesive area of the silicone rubber was measured and indicated as CF (%).

Reference Example 1

First, 100.0 parts by mass of a dimethylpolysiloxane capped at both molecular chain terminals with dimethylvinylsiloxy groups and having a viscosity of 40,000 mPa·s, 48 parts by mass of fumed silica having a BET specific surface area of 300 $m^2/g$ (HDK T30P manufactured by Wacker); 18.0 parts by mass of hexamethyldisilazane, 0.5 parts by mass of 1,1,3,3-tetramethyl-1,3-divinyldisilazane, and 6.0 parts by mass of water were kneaded at room temperature using a Ross mixer. Next, a silicone rubber base (1) having a viscosity of 520 mPa·s was prepared by heating and mixing at 150° C. for one hour under reduced pressure.

Reference Example 2

First, 100.0 parts by mass of a dimethylpolysiloxane capped at both molecular chain terminals with dimethylvinylsiloxy groups and having a viscosity of 40,000 mPa·s, 48 parts by mass of fumed silica having a BET specific surface area of 300 $m^2/g$ (HDK T30P manufactured by Wacker); 22.5 parts by mass of hexamethyldisilazane, 0.5 parts by mass of 1,1,3,3-tetramethyl-1,3-divinyldisilazane, and 7.5 parts by mass of water were kneaded at room temperature using a Ross mixer. Next, a silicone rubber base (2) having a viscosity of 567 mPa·s was prepared by heating and mixing at 150° C. for one hour under reduced pressure.

Reference Example 3

First, 100.0 parts by mass of a dimethylpolysiloxane capped at both molecular chain terminals with dimethylvinylsiloxy groups and having a viscosity of 40,000 mPa·s, 48 parts by mass of fumed silica having a BET specific surface area of 300 $m^2/g$ (HDK T30P manufactured by Wacker); 9.0 parts by mass of hexamethyldisilazane, 0.5 parts by mass of 1,1,3,3-tetramethyl-1,3-divinyldisilazane, and 3.0 parts by mass of water were kneaded at room temperature using a Ross mixer. Next, a silicone rubber base (3) having a viscosity of 745 mPa·s was prepared by heating and mixing at 150° C. for one hour under reduced pressure.

Example 1

First, 6.5 parts by mass of a dimethylpolysiloxane capped at both molecular chain terminals with dimethylvinylsiloxy groups and having a viscosity of 40,000 mPa·s, 10.5 parts by mass of a dimethylsiloxane/methylvinylsiloxane copolymer capped at both molecular chain terminals with dimethylvinylsiloxy groups and having a viscosity of 370 mPa·s, 2.0 parts by mass of a diacrylic acid ester represented by the following formula:

[Formula 19]

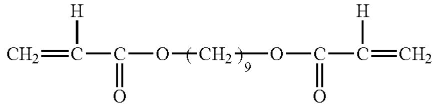

a dimethylsiloxane/methylhydrogensiloxane copolymer capped at both molecular chain terminals with trimethylsiloxy groups and having a viscosity of 43 mPa·s (in an amount such that the silicon atom-bonded hydrogen atoms are 1.5 mol with respect to 1 mol of aliphatic unsaturated bonds in the present composition), a methylhydrogencyclosiloxane having a viscosity of 1 mPa·s (in an amount such that the silicon atom-bonded hydrogen atoms are 0.9 mol with respect to 1 mol of aliphatic unsaturated bonds in the present composition), 0.1 parts by mass of 1-ethynyl-cyclohexan-1-ol, and a 1,3-divinyl-1,1,3,3-tetramethyldisiloxane complex of platinum (in an amount such that the platinum metal in the component is 170 ppm in mass units with respect to the present composition) were added to 176.8 parts by mass of the silicone rubber base (1) prepared in Reference Example 1 and then mixed uniformly at room temperature to prepare a silicone rubber composition. The characteristics of the silicone rubber obtained by curing this silicone rubber composition are shown in Table 1.

Comparative Example 1

First, 6.5 parts by mass of a dimethylpolysiloxane capped at both molecular chain terminals with dimethylvinylsiloxy groups and having a viscosity of 40,000 mPa·s, 10.5 parts by mass of a dimethylsiloxane/methylvinylsiloxane copolymer capped at both molecular chain terminals with dimethylvinylsiloxy groups and having a viscosity of 370 mPa·s, 2.0 parts by mass of a diacrylic acid ester represented by the following formula:

[Formula 20]

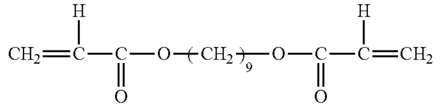

a dimethylsiloxane/methylhydrogensiloxane copolymer capped at both molecular chain terminals with trimethylsiloxy groups and having a viscosity of 43 mPa·s (in an amount such that the silicon atom-bonded hydrogen atoms are 1.5 mol with respect to 1 mol of aliphatic unsaturated bonds in the present composition), a methylhydrogencyclosiloxane having a viscosity of 1 mPa·s (in an amount such that the silicon atom-bonded hydrogen atoms are 0.9 mol with respect to 1 mol of aliphatic unsaturated bonds in the present composition), 0.1 parts by mass of 1-ethynyl-cyclohexan-1-ol, and a 1,3-divinyl-1,1,3,3-tetramethyldisiloxane complex of platinum (in an amount so that the platinum metal in the component is 170 ppm in mass units with respect to the present composition) were added to 176.8 parts by mass of the silicone rubber base (3) prepared in Reference Example 3 and then mixed uniformly at room temperature to prepare a silicone rubber composition. The characteristics of the silicone rubber obtained by curing this silicone rubber composition are shown in Table 1.

Example 2

First, 15.6 parts by mass of a dimethylpolysiloxane capped at both molecular chain terminals with dimethylvinylsiloxy groups and having a viscosity of 40,000 mPa·s, 10.5 parts by mass of a dimethylsiloxane/methylvinylsiloxane copolymer capped at both molecular chain terminals with dimethylvinylsiloxy groups and having a viscosity of 370 mPa·s, 2.0 parts by mass of a diacrylic acid ester represented by the following formula:

[Formula 21]

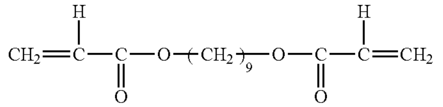

a methylhydrogenpolysiloxane capped at both molecular chain terminals with trimethylsiloxy groups and having a viscosity of 20 mPa·s (in an amount such that the silicon atom-bonded hydrogen atoms are 1.2 mol with respect to 1 mol of aliphatic unsaturated bonds in the present composition), 2.0 parts by mass of an organosiloxane represented by the following formula:

[Formula 22]

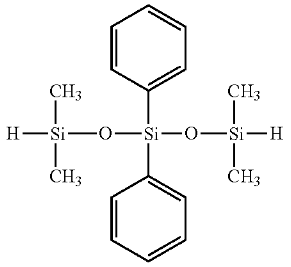

1.6 parts by mass of an organosiloxane represented by the following formula:

[Formula 23]

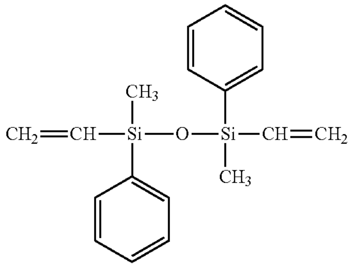

0.1 parts by mass of 1-ethynyl-cyclohexan-1-ol, and a 1,3-divinyl-1,1,3,3-tetramethyldisiloxane complex of platinum (in an amount such that the platinum metal in the component is 140 ppm in mass units with respect to the present composition) were added to 160.0 parts by mass of the silicone rubber base (1) prepared in Reference Example 1 and mixed uniformly at room temperature to prepare a silicone rubber composition. The characteristics of the silicone rubber obtained by curing this silicone rubber composition are shown in Table 1.

Comparative Example 2

First, 15.6 parts by mass of a dimethylpolysiloxane capped at both molecular chain terminals with dimethylvinylsiloxy groups and having a viscosity of 40,000 mPa·s, 10.5 parts by mass of a dimethylsiloxane/methylvinylsiloxane copolymer capped at both molecular chain terminals with dimethylvinylsiloxy groups and having a viscosity of 370 mPa·s, 2.0 parts by mass of a diacrylic acid ester represented by the following formula:

[Formula 24]

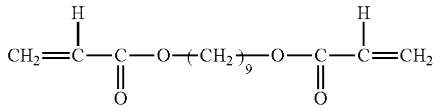

a methylhydrogenpolysiloxane capped at both molecular chain terminals with trimethylsiloxy groups and having a viscosity of 20 mPa·s (in an amount such that the silicon atom-bonded hydrogen atoms are 1.2 mol with respect to 1 mol of aliphatic unsaturated bonds in the present composition), 2.0 parts by mass of an organosiloxane represented by the following formula:

[Formula 25]

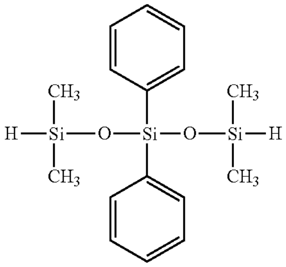

1.6 parts by mass of an organosiloxane represented by the following formula:

[Formula 26]

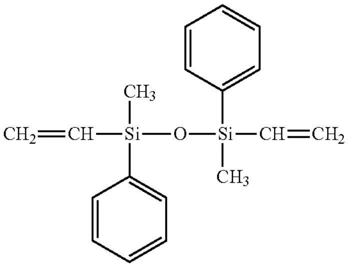

0.1 parts by mass of 1-ethynyl-cyclohexan-1-ol, and a 1,3-divinyl-1,1,3,3-tetramethyldisiloxane complex of platinum (in an amount such that the platinum metal in the component is 140 ppm in mass units with respect to the present composition) were added to 160.0 parts by mass of the silicone rubber base (3) prepared in Reference Example 3 and mixed uniformly at room temperature to prepare a silicone rubber composition. The characteristics of the silicone rubber obtained by curing this silicone rubber composition are shown in Table 1.

Example 3

First, 15.6 parts by mass of a dimethylpolysiloxane capped at both molecular chain terminals with dimethylvinylsiloxy groups and having a viscosity of 40,000 mPa·s, 10.5 parts by mass of a dimethylsiloxane/methylvinylsiloxane copolymer capped at both molecular chain terminals with dimethylvinylsiloxy groups and having a viscosity of 370 mPa·s, 2.0 parts by mass of a diacrylic acid ester represented by the following formula:

[Formula 27]

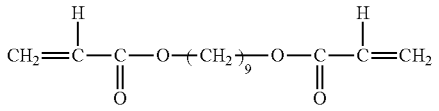

a methylhydrogenpolysiloxane capped at both molecular chain terminals with trimethylsiloxy groups and having a viscosity of 20 mPa·s (in an amount such that the silicon atom-bonded hydrogen atoms are 1.2 mol with respect to 1 mol of aliphatic unsaturated bonds in the present composition), 2.0 parts by mass of an organosiloxane represented by the following formula:

[Formula 28]

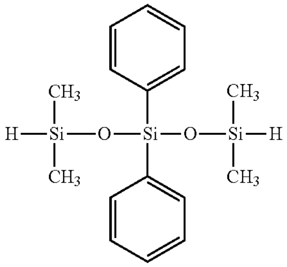

1.6 parts by mass of an organosiloxane represented by the following formula:

[Formula 29]

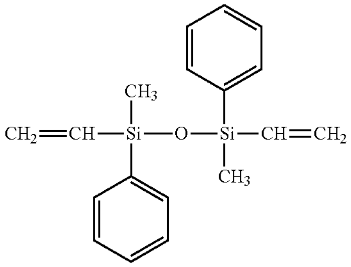

0.1 parts by mass of 1-ethynyl-cyclohexan-1-ol, and a 1,3-divinyl-1,1,3,3-tetramethyldisiloxane complex of platinum (in an amount such that the platinum metal in the component is 170 ppm in mass units with respect to the present composition) were added to 160.0 parts by mass of the silicone rubber base (2) prepared in Reference Example 2 and mixed uniformly at room temperature to prepare a silicone rubber composition. The characteristics of the silicone rubber obtained by curing this silicone rubber composition are shown in Table 1.

Example 4

First, 5.9 parts by mass of a dimethylpolysiloxane capped at both molecular chain terminals with dimethylvinylsiloxy groups and having a viscosity of 40,000 mPa·s, 10.2 parts by mass of a dimethylsiloxane/methylvinylsiloxane copolymer capped at both molecular chain terminals with dimethylvinylsiloxy groups and having a viscosity of 370 mPa·s, 0.5 parts by mass of a diacrylic acid ester represented by the following formula:

[Formula 30]

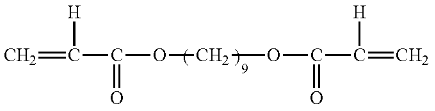

1.0 parts by mass of a tetraacrylic acid ester represented by the following formula:

[Formula 31]

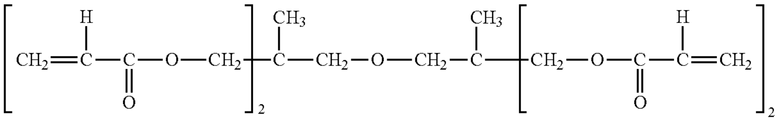

a methylhydrogenpolysiloxane including a siloxane unit represented by $(CH_3)_2HSiO_{1/2}$ and a siloxane unit represented by a $SiO_{4/2}$ unit and having a viscosity of 25 mPa·s (in an amount such that the silicon atom-bonded hydrogen atoms are 1.2 mol with respect to 1 mol of aliphatic unsaturated bonds in the present composition), 2.0 parts by mass of an organosiloxane represented by the following formula:

[Formula 32]

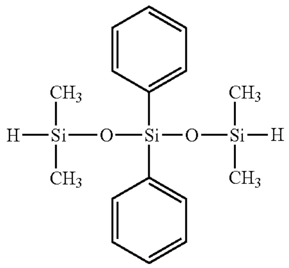

1.6 parts by mass of an organosiloxane represented by the following formula:

[Formula 33]

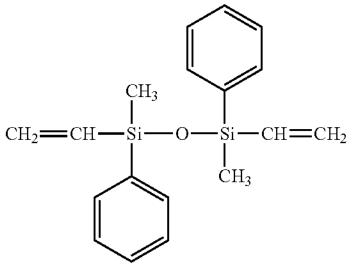

0.1 parts by mass of 1-ethynyl-cyclohexan-1-ol, and a 1,3-divinyl-1,1,3,3-tetramethyldisiloxane complex of platinum (in an amount such that the platinum metal in the component is 140 ppm in mass units with respect to the present composition) were added to 168.0 parts by mass of the silicone rubber base (1) prepared in Reference Example 1 and mixed uniformly at room temperature to prepare a silicone rubber composition. The characteristics of the silicone rubber obtained by curing this silicone rubber composition are shown in Table 1.

TABLE 1

| | Segment | | | | | |
|---|---|---|---|---|---|---|
| | Example | | | | Comparative Example | |
| Items | 1 | 2 | 3 | 4 | 1 | 2 |
| Hardness of silicone rubber | 51 | 50 | 54 | 52 | 56 | 58 |
| Adhesion of silicone rubber | | | | | | |
| Peel adhesion strength (N/25 mm) | 460 | 415 | 460 | 252 | 68 | 228 |
| Polycarbonate resin CF (%) | 100 | 100 | 100 | 100 | 63 | 100 |
| Carbon steel CF (%) | 0 | 0 | 0 | 0 | 0 | 0 |

INDUSTRIAL APPLICABILITY

The silicone rubber composition of the present invention exhibits excellent adhesion to various organic resins in contact during curing while simultaneously exhibiting excellent mold releasability with respect to a mold used for the molding thereof. Therefore, this silicone rubber composition is suitable as a silicone rubber composition for integral molding with an organic resin.

The invention claimed is:

1. A silicone rubber composition comprising:

(A) 100 parts by mass of an organopolysiloxane having at least two alkenyl groups in each molecule;

(B) from 1 to 100 parts by mass of a silica filler;

(C) an organosiloxane having at least two silicon atom-bonded hydrogen atoms in each molecule and not having an alkenyl group, in an amount such that the silicon atom-bonded hydrogen atoms in the component are from 0.5 to 5 mol per 1 mol of the total of aliphatic saturated bonds in the composition;

(D) a catalytic amount of a hydrosilylation reaction catalyst; and (F) from 0.01 to 20 parts by mass of an adhesion promoter;

wherein component (B) is a silica filler formed by surface-treating at least 30 parts by mass of (E) a surface treatment agent with respect to 100 parts by mass of a silica filler having a specific surface area of at least 50 $m^2/g$ in the presence of component (A), and wherein component (E) comprises at least one type of silazane compound.

2. The silicone rubber composition according to claim 1, wherein component (E) comprises hexamethyldisilazane and/or tetramethyldivinyldisilazane.

3. The silicone rubber composition according to claim 1, wherein component (F) is at least one type of compound selected from the group consisting of acrylic compounds, methacrylic compounds, epoxy compounds, organosilicon compounds having at least one phenylene skeleton in each molecule, and organo silicon compounds having at least one silicon atom-bonded hydrolyzable group in each molecule.

4. The silicone rubber composition according to claim 3, wherein component (F) is an acrylic compound or a methyacrylic compound having an ester bond in each molecule.

5. The silicone rubber composition according to claim 3, wherein component (F) is at least one type of acrylic compound or methacrylic compound selected from compounds represented by the following general formulas:

[Formula 1]

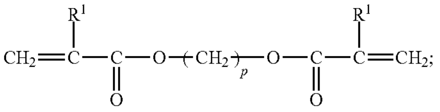

[Formula 2]

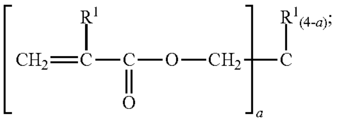

[Formula 3]

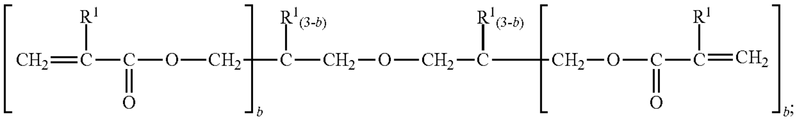

[Formula 4]

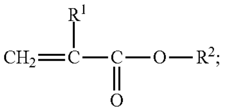

wherein each $R^1$ is independently a hydrogen atom or a methyl group; $R^2$ is an aralkyl group, a phenoxyalkyl group, or a phenoxyhydroxyalkyl group having from 7 to 20 carbon atoms; “a” is an integer from 1 to 4; each “b” is independently an integer from 1 to 3; and “p” is an integer from 4 to 12.

6. The silicone rubber composition according to claim 1, further comprising: (G) (G-1) an organosiloxane having at least one aryl group and at least one silicon atom-bonded hydrogen atom in each molecule; or a mixture of component (G-1) and (G-2) an organosiloxane having at least one aryl group and at least one alkenyl group in each molecule, in an amount of from 0.1 to 5 parts by mass per 100 parts by mass of component (A).

7. The silicone rubber composition according to claim 6, wherein component (G-1) is an organosiloxane represented by the following general formula:

[Formula 5]

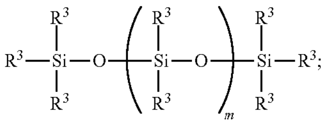

wherein each $R^3$ is independently a hydrogen group, an alkyl group having from 1 to 12 carbon atoms, or an aryl group having from 6 to 12 atoms, however, at least one $R^3$ is the hydrogen atom and at least one $R^3$ is the aryl group; and “m” is an integer from 1 to 20.

8. The silicone rubber composition according to claim 6, wherein component (G-2) is present and is an organosiloxane represented by the following general formula:

[Formula 6]

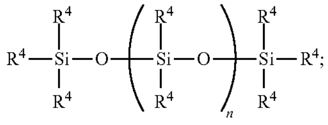

wherein each $R^4$ is independently an alkenyl group having from 2 to 12 carbon atoms, an alkyl group having from 1 to 12 carbon atoms, or an aryl group having from 6 to 12 carbon atoms, however, at least one $R^4$ is the alkenyl group and at least one $R^4$ is the aryl group; and “n” is an integer from 0 to 20.

9. The silicone rubber composition according to claim 6, wherein component (G) is a mixture of component (G-1) and component (G-2) having a mass ratio of from 1:10 to 10:1 of component (G-1) and component (G-2).

10. A composite material comprising: a silicone rubber formed by curing the silicone rubber composition according to claim 1; and an organic resin; wherein the silicone rubber is adhered to the organic resin.

11. The composite material according to claim 10, wherein the organic resin is at least one type of organic resin selected from the group consisting of acrylonitrile/butadiene/styrene copolymers, polyphenylene/styrene mixtures, polystyrenes, polycarbonates, polyurethanes, polyethylenes, polypropylenes, polyacrylates, polymethacrylates, polyacrylamides, polyesters, polyethylene terephthalates, polybutylene terephthalates, polyphenylene oxides, polyphenylene sulfides, polysulfones, nylons, polyamides, polyimides, fluoropolymers, liquid crystal resins, polyether imides, phenol resins, epoxy resins, urea resins, melamine resins, alkyd resins, and derivatives of these organic resins.

* * * * *